(12) United States Patent
Miralles

(10) Patent No.: US 10,875,631 B2
(45) Date of Patent: *Dec. 29, 2020

(54) UNMANNED AERIAL VEHICLE ANGULAR REORIENTATION

(71) Applicant: AeroVironment, Inc., Simi Valley, CA (US)

(72) Inventor: Carlos Thomas Miralles, Burbank, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,702

(22) Filed: May 24, 2019

(65) Prior Publication Data

US 2020/0039636 A1   Feb. 6, 2020

Related U.S. Application Data

(63) Continuation of application No. 15/689,945, filed on Aug. 29, 2017, now Pat. No. 10,343,766, which is a (Continued)

(51) Int. Cl.
*B64C 13/16* (2006.01)
*G05D 1/12* (2006.01)
(Continued)

(52) U.S. Cl.
CPC ............ *B64C 13/16* (2013.01); *B64C 39/024* (2013.01); *F41G 7/2253* (2013.01);
(Continued)

(58) Field of Classification Search
CPC ... B64C 13/16; B64C 39/024; B64C 2201/04; B64C 2201/121; B64C 2201/141;
(Continued)

(56) References Cited

U.S. PATENT DOCUMENTS

D317,003 S   5/1991   Tribe et al.
5,322,243 A   6/1994   Stoy
(Continued)

OTHER PUBLICATIONS

International Search Report and Written Opinion for serial No. PCT/US2012/027619 dated Jun. 20, 2012.
(Continued)

*Primary Examiner* — Maceeh Anwari
(74) *Attorney, Agent, or Firm* — Concept IP LLP; Pejman Yedidsion; Eric Aagaard

(57) ABSTRACT

A system comprising an unmanned aerial vehicle (UAV) having wing elements and tail elements configured to roll to angularly orient the UAV by rolling so as to align a longitudinal plane of the UAV, in its late terminal phase, with a target. A method of UAV body re-orientation comprising: (a) determining by a processor a boresight angle error correction value bases on distance between a target point and a boresight point of a body-fixed frame; and (b) effecting a UAV maneuver comprising an angular role rate component translating the target point to a reoriented target point in the body-fixed frame, to maintain the offset angle via the offset angle correction value.

20 Claims, 12 Drawing Sheets

Related U.S. Application Data continuation of application No. 14/947,871, filed on Nov. 20, 2015, now Pat. No. 9,776,709, which is a continuation of application No. 14/016,602, filed on Sep. 3, 2013, now Pat. No. 9,211,947, which is a continuation of application No. PCT/US2012/027619, filed on Mar. 2, 2012.

(60) Provisional application No. 61/448,596, filed on Mar. 2, 2011.

(51) Int. Cl.
*F41G 7/22* (2006.01)
*B64C 39/02* (2006.01)

(52) U.S. Cl.
CPC ......... *F41G 7/2286* (2013.01); *F41G 7/2293* (2013.01); *G05D 1/12* (2013.01); *B64B 2201/00* (2013.01); *B64C 2201/04* (2013.01); *B64C 2201/121* (2013.01); *B64C 2201/141* (2013.01); *B64C 2201/165* (2013.01)

(58) Field of Classification Search
CPC ............. B64C 2201/165; F41G 7/2286; F41G 7/2253; F41G 7/2293; G05D 1/12; B64B 2201/00
USPC .............................................................. 701/3
See application file for complete search history.

(56) References Cited

U.S. PATENT DOCUMENTS

| | | |
|---|---|---|
| D417,639 S | 12/1999 | Carichner et al. |
| D461,159 S | 8/2002 | Miralles et al. |
| 6,601,795 B1 | 8/2003 | Chen |
| 6,856,894 B1 | 2/2005 | Bodin et al. |
| 7,218,273 B1 | 5/2007 | Webster et al. |
| 7,338,010 B2 | 3/2008 | Corder et al. |
| 7,584,925 B2 | 9/2009 | Miller et al. |
| 7,793,606 B2 | 9/2010 | LaCour |
| 7,816,635 B2 | 10/2010 | Fink |
| 8,089,034 B2 | 1/2012 | Hammerquist |
| 2002/0021243 A1 | 2/2002 | Speyer et al. |
| 2006/0058928 A1 | 3/2006 | Beard et al. |
| 2006/0060694 A1 | 3/2006 | Nonami et al. |
| 2007/0152098 A1 | 7/2007 | Sheahan et al. |
| 2010/0198514 A1 | 8/2010 | Miralles |

OTHER PUBLICATIONS

Non-Final Office action for U.S. Appl. No. 14/947,871 dated Oct. 6, 2016.
Non-Final Office action for U.S. Appl. No. 14/016,602 dated Dec. 12, 2014.
Non-Final Office action for U.S. Appl. No. 14/016,602 dated Jul. 17, 2014.
Non-Final Office action for U.S. Appl. No. 14/016,602 dated Jul. 8, 2014.
Notice of Allowance for U.S. Appl. No. 14/947,871 dated May 30, 2017.
Notice of Allowance for U.S. Appl. No. 14/016,602 dated Aug. 12, 2015.

UNMANNED AERIAL VEHICLE ANGULAR REORIENTATION

CROSS REFERENCE TO RELATED APPLICATIONS

This application is a continuation of U.S. Nonprovisional patent application Ser. No. 15/689,945, filed Aug. 29, 2017, which is a continuation of U.S. Nonprovisional patent application Ser. No. 14/947,871, filed Nov. 20, 2015, which issued as U.S. Pat. No. 9,776,709 on Oct. 3, 2017, which is a continuation of U.S. Nonprovisional patent application Ser. No. 14/016,602, filed Sep. 3, 2013, which issued as U.S. Pat. No. 9,211,947 on Dec. 15, 2015, which is a continuation of International Application No. PCT/US2012/027619 filed Mar. 2, 2012, which claims priority to and the benefit of U.S. Provisional Application No. 61/448,596 filed Mar. 2, 2011, the disclosures of all of which are incorporated by reference herein for all purposes.

TECHNICAL FIELD

Embodiments pertain to unmanned aerial vehicles (UAVs) and particularly to the angular reorientation of small and/or man-portable UAVs in the endgame phase of terminal homing.

BACKGROUND

A UAV may be guided by a human-in-the-loop, a human intermittently up-linking course corrections, e.g., via supervisory control, or via vehicle-borne computer processing and memory store having a preloaded intercept/strike point in combination with an onboard flight path guidance generator and outputs of inertial sensors and/or from a Global Positioning System (GPS) receiver.

SUMMARY

Embodiments include an unmanned aerial vehicle (UAV) that comprises a processor having addressable memory, the processor configured to: (a) determine a body roll angle error based on a target location in a body reference frame and an orientation of the UAV in the body reference frame; and (b) determine one or more aileron actuator commands based on the determined body roll angle error. Embodiments may also include a processor of the UAV further configured to bank-to-turn, and to transition to reorient in attitude based on an estimated range-to-go and an angular position of the target relative to the UAV.

Some embodiments include a method of unmanned aerial vehicle (UAV) body re-orientation which comprises: (a) determining, by a processor, a boresight offset angle error correction value based on a distance between a target point and a boresight point of a body-fixed image frame; and (b) effecting, by the processor, an onboard control surface actuation maneuver comprising an angular roll component to translate the target point in the body-fixed frame to thereby maintain the offset angle via the offset angle correction value. In some embodiments the method of UAV body re-orientation may further comprise: effecting, by the processor, an onboard control surface actuation maneuver comprising a pitch component to translate the target point in the body-fixed frame to thereby maintain the offset angle via the offset angle correction value.

BRIEF DESCRIPTION OF THE DRAWINGS

Embodiments are illustrated by way of example and not limitation in the figures of the accompanying drawings, and in which.

DETAILED DESCRIPTION

Figure 1:
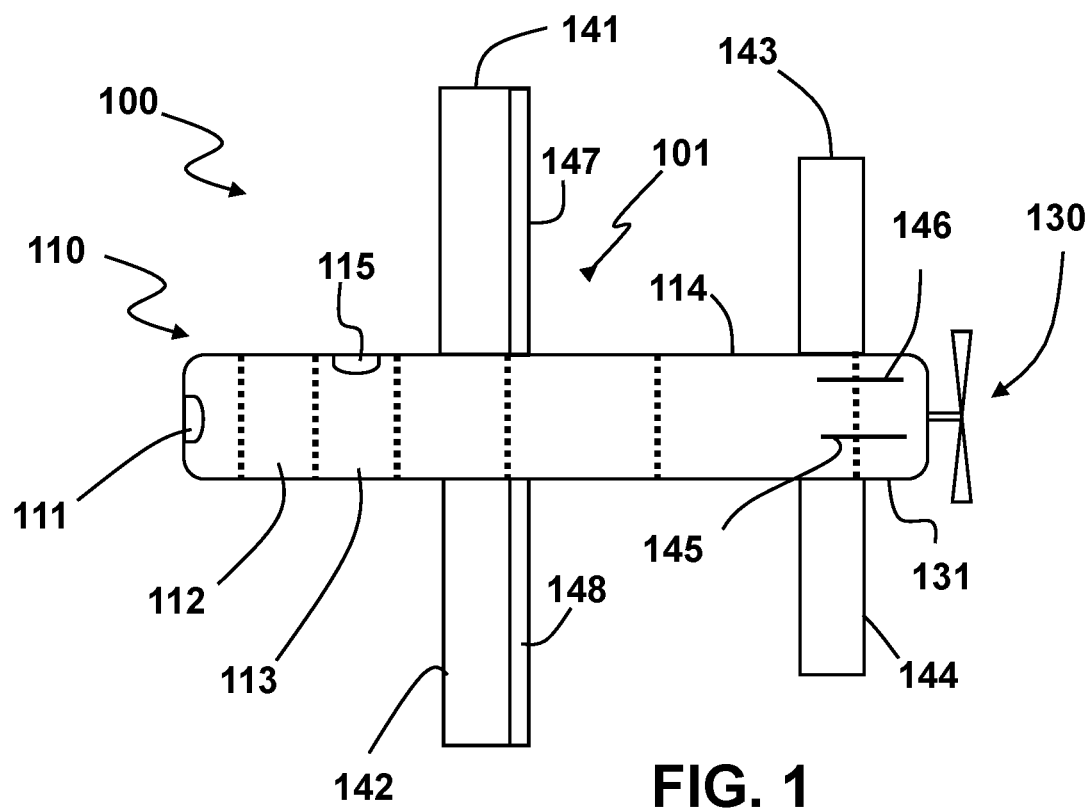
FIG. 1 depicts a top view of an exemplary embodiment of the UAV.

Reference is made to the drawings that illustrate exemplary embodiments of the UAV. FIG. 1 illustrates a top view of an exemplary embodiment of the UAV portion 100. The exemplary UAV is depicted as comprising a fuselage 101 with a front end 110 having a homing sensor 111, e.g., a pixel array for sensing visible and/or infrared light, and a deployable payload section 112, e.g., a warhead or other payload for precision delivery that may be lethal or non-lethal in nature, i.e. a deployable electronic subassembly, such as a pigmenting capsule. The front end 110 may be configured to support various warheads such as those that may be high explosive (HE), armor-piercing, a shaped-charge, anti-personnel, anti-radiation, electro-magnetic pulse (EMP) and/or a directed blast. These warheads may be removable and/or interchangeable. The front end 110 may be configured to support an additional battery pack in lieu of or in partial place of a warhead unit, which may extend the range of the UAV. Embodiments of the UAV may have a sensor suite, including one or more forward-facing sensors 111, and one or more side-facing sensors 115, that may comprise one or more of the following passive and/or active receivers such as: a radar imaging sensor, such as a millimeter wave system; a laser receiver and/or transmitter; a laser imaging system, such as a light detection and ranging (LiDAR) device; and other electromagnetic detectors, such as radio wave receivers. Commercial sources for these exemplary front end sensors include the Micron MT9P031 and 5MP CMOS Digital Image Sensor by Micron Technology, Inc. of Boise, Id. 83707-0006. The front end 110 may also include an electronics assembly (EA) 113, or avionics, that may include a guidance processor comprising guidance instructions that, when executed, take in information pertaining to the UAV position, linear and/or rotational velocities, linear accelerations and/or attitude, and generate commands for autopilot processing and/or engine control processing and/or remote human pilot processing. The front end 110 or particularly the EA 113 may also include the side-viewing sensor such as camera 115 that may be disposed or otherwise positioned to allow viewing of an object or target while the UAV is turning about the object or target. For example, by banking the UAV such that the side-viewing sensor 115 is aimed toward the ground, the sensor 115 could observe a ground target, or generally a target within the UAV's plane of orbit, while the UAV revolves about the target. In addition to a camera, or instead of a camera, the sensor 115 any of the exemplary sensors as set forth herein for the forward disposed or forward-facing sensor 111.

The UAV may comprise one or more power sources 114, such as battery units, combustion engines including internal combustions engines, turbines, or fuel cells, and power conditioning circuits. Additionally, a propulsive power source, such as a turbine engine, or a solid or liquid rocket motor, may augment or replace a propeller system. Embodiments of the UAV may include a chemical battery store, e.g., storing approximately 44 watt-hours of energy that may be used to power onboard electrical devices, including a propeller motor, for a flight of ten to thirty minutes for a UAV having an airborne, launch, or flight mass in the range of 1.0 to 1.5 kilograms, where for some UAV embodiments, and depending on propulsion system, the UAV may have a launch mass of 0.5 to 25 kilograms. Embodiments of the UAV may be smaller and/or have shorter flight durations and/or have less mass, and/or have a different lift-to-drag ratio, and accordingly may require less than 44-watt hours. Additional embodiments of the UAV may be larger and/or have longer flight durations, and accordingly may require more than 44-watt hours. As the vehicle mass grows over approximately 1.3 kilograms, thrust and lift requirements for an efficient terminal homing cone may require the vehicle to include a combustion engine augmenting a battery-electrical system having greater than 44-watt hours, such a hybrid system, or replace the battery-electric system with an internal combustion engine and/or a turbine engine. The UAV may include vehicle-specific sensors, e.g., a GPS antenna and GPS receiver, as part of the EA and/or attitude and/or rate gyroscopes and/or linear accelerometers that may be proximate to the EA and/or vehicle center of gravity. The UAV may include a mode of thrust generation, such as a propeller 130 and a propeller motor 131. Other embodiments may use, separately or in combination, turbine motors and/or rocket motors (not shown).

The UAV may have lifting surfaces such as a starboard wing 141, a port wing 142, a port tail 144, a starboard tail 143, and one or more rudders 145, 146. The wing elements 141, 142 may have actuated control surfaces 147, 148, operating as elevons, or may be embodied as wings with surfaces that may be operated, e.g., rotationally relative to the fuselage, as elevators. Embodiments of the UAV may have a minimum for level flight with a maneuver margin of about 1.2 to 2.0 times the acceleration of gravity, sustainable for a major portion of the duration of a sortie. In a terminal homing mode, and at intercept abort point, embodiments of the UAV may have a maneuver margin of about 2.0 to 2.5 times the acceleration of gravity. Higher accelerations characterizing maneuverability may be desired, but are balances to recognize these higher levels are achievable with a bigger wing, and/or higher lift, airfoils, and that those require additional weight and volume. Embodiments of the UAV may have a wing area of 0.049 square meters (about 76 square inches) and may be in the range of 0.016 square meters (about 25 square inches) to 1.0 square meters (about 1,550 square inches).

The exemplary pair of tail elements 143, 144 may have actuated control surfaces, and may be operated as ailerons or elevators. The UAV may include a rudder portion comprising one or more rudders where the exemplary port rudder 145 and the starboard rudder 146 of the UAV may be body-fixed, i.e., the rudders 145, 146 function as vertical stabilizers, and accordingly, the UAV may be statically stable in yaw, i.e., in trimmed flight, the yaw center of pressure is aft of the vehicle center of gravity thereby aerodynamically stabilizing the UAV—at least in the yaw plane. The UAV yaw stability may be augmented by articulated, controlled trailing sections or surfaces of the one or more rudder surfaces. Some embodiments of the UAV may have a two-rudder assembly mounted on a rotatable platform conformal to the UAV fuselage to effect an augmentation in yaw control.

Accordingly, some embodiments of the UAV may be configured to transition from a terminal homing mode trajectory to a target search mode trajectory and then to a terminal homing mode trajectory, where the UAV has a launch weight mass of less than 25 kilograms, and is powered in flight via a propeller driven by a chemical battery store, a combustion engine, or both. In some embodiments, the UAV may be powered by a turbine engine. Embodiments of the UAV may be configured to transition from a terminal homing mode trajectory to a target search mode trajectory and then to a terminal homing mode trajectory while having airspeeds in the range 50 to 120 knots, and a flight duration of about 20 minutes, where the exemplary UAV has a launch weight mass of 1.0 to 2.0 kilograms mass, and is powered in flight via a propeller driven a chemical battery store, a combustion engine, or both.

Figure 2:
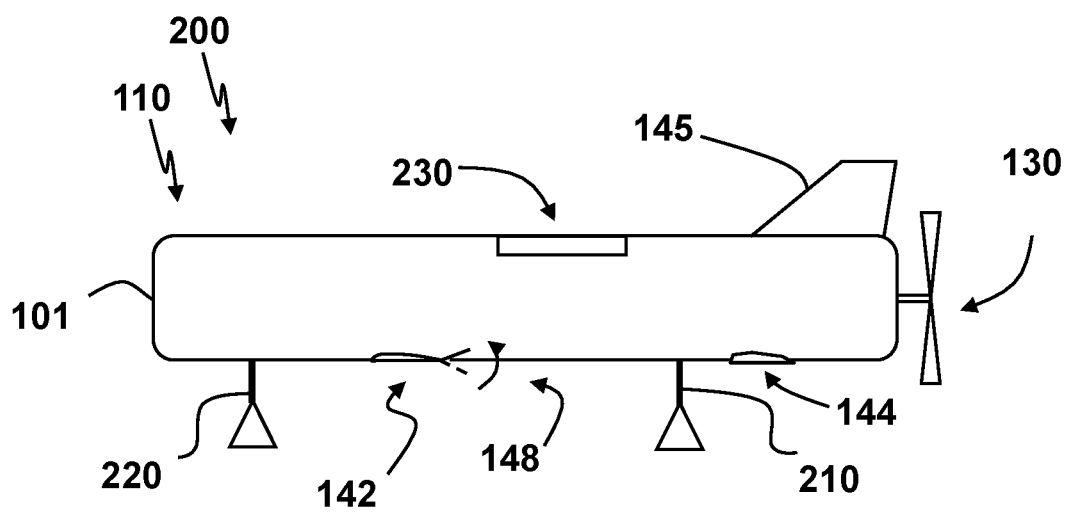
FIG. 2 depicts a side view of an exemplary embodiment of the UAV.

FIG. 2 shows in side view 200 the exemplary UAV where the port wing 142 is shown with the trailing control surface 148 in motion and with two antenna wires 210, 220 (not to scale) extending from the fuselage 101. One antenna element may be used as an uplink 210, particularly for receiving a mode control signal that effects a transition from a terminal homing mode to a target search mode, or loiter mode, or a transition from target search mode to a homing mode, e.g., a terminal homing mode. Another antennal element may be used as a downlink 220 for transmitting data such as live video, automatic video tracking status, flight parameters, and/or UAV states, e.g., states of vehicle operation and/or flight state. A single antenna may be used for both functions when equipped with transceiver capability. While video data and flight status data may be down-linked, the UAV may process output from various onboard flight sensors, e.g., gyros, accelerometers, GPS receiver outputs, and target data from the image sensor 111, or other front end target seeker/tracker sensor, via an onboard processor to generate control surface actuation commands and accordingly guide the UAV for both target search and terminal homing phases and the transition therebetween. A GPS antenna 230 may be mounted conformably or within the fuselage, i.e., behind the skin of the fuselage when made of material largely transparent, i.e., low loss, in the GPS frequency bands. Generally, the GPS antenna may be mounted, or otherwise disposed, on or along the UAV fuselage 101 so as to be capable of receiving signals for the onboard GPS receiver from a GPS satellite constellation.

Figure 3A:
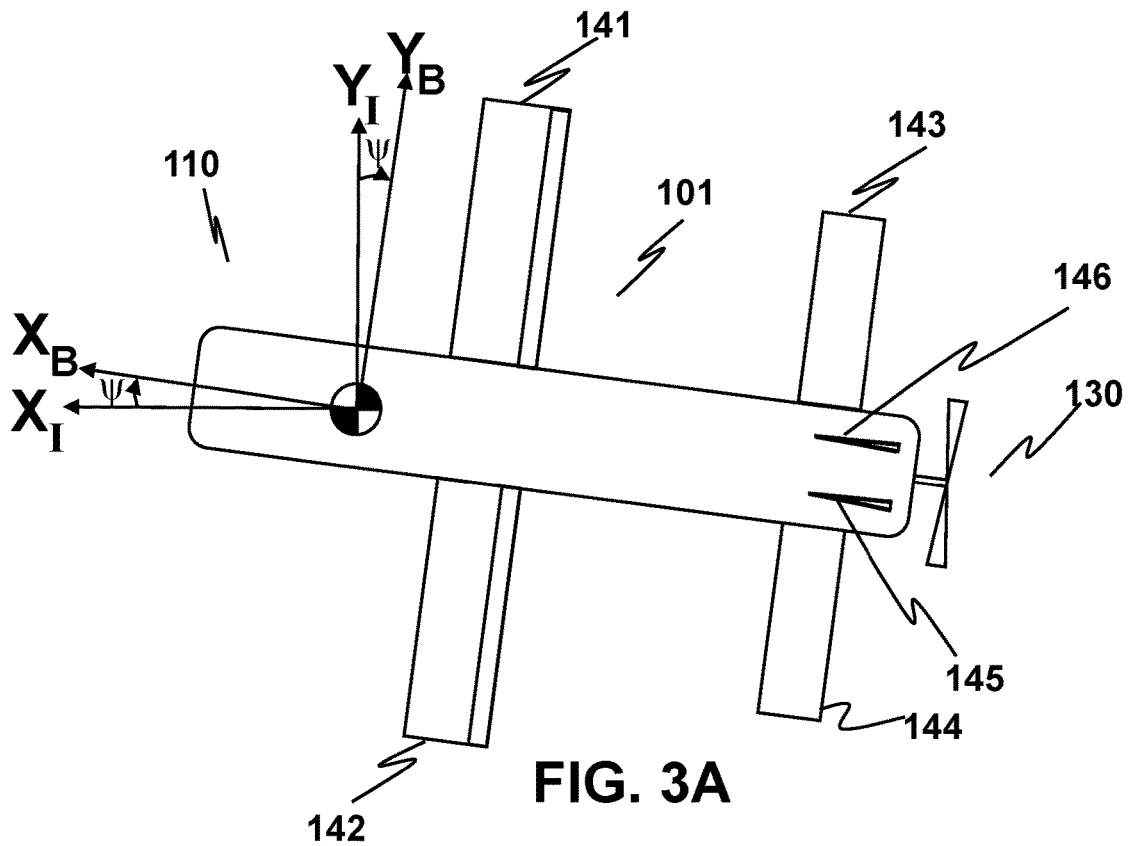
FIG. 3A depicts a top plan view of an exemplary embodiment of the UAV.
Figure 3B:
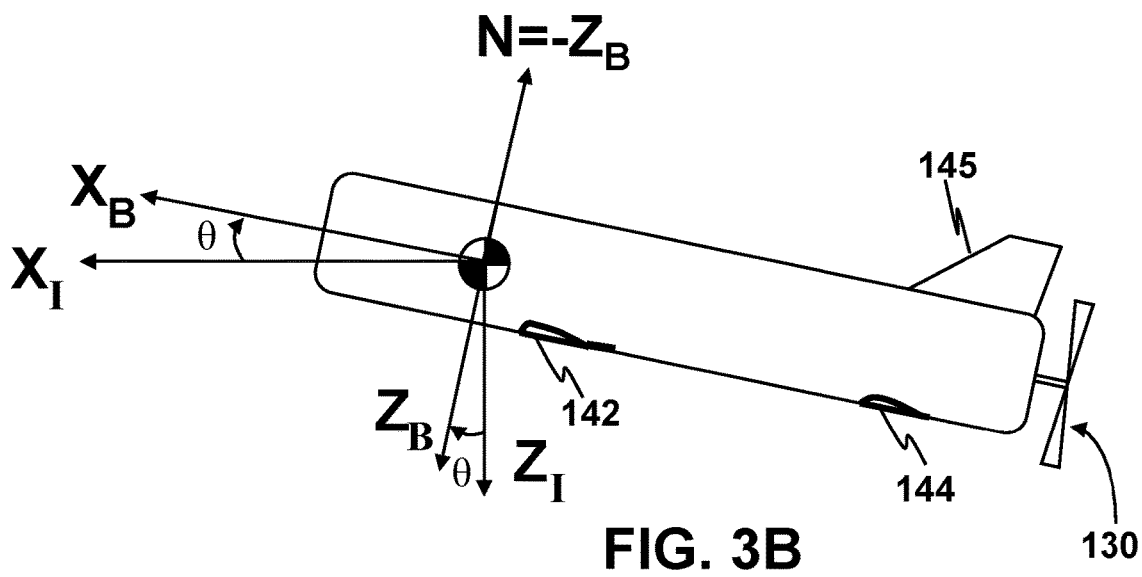
FIG. 3B depicts a side view of an exemplary embodiment of the UAV.
Figure 4A:
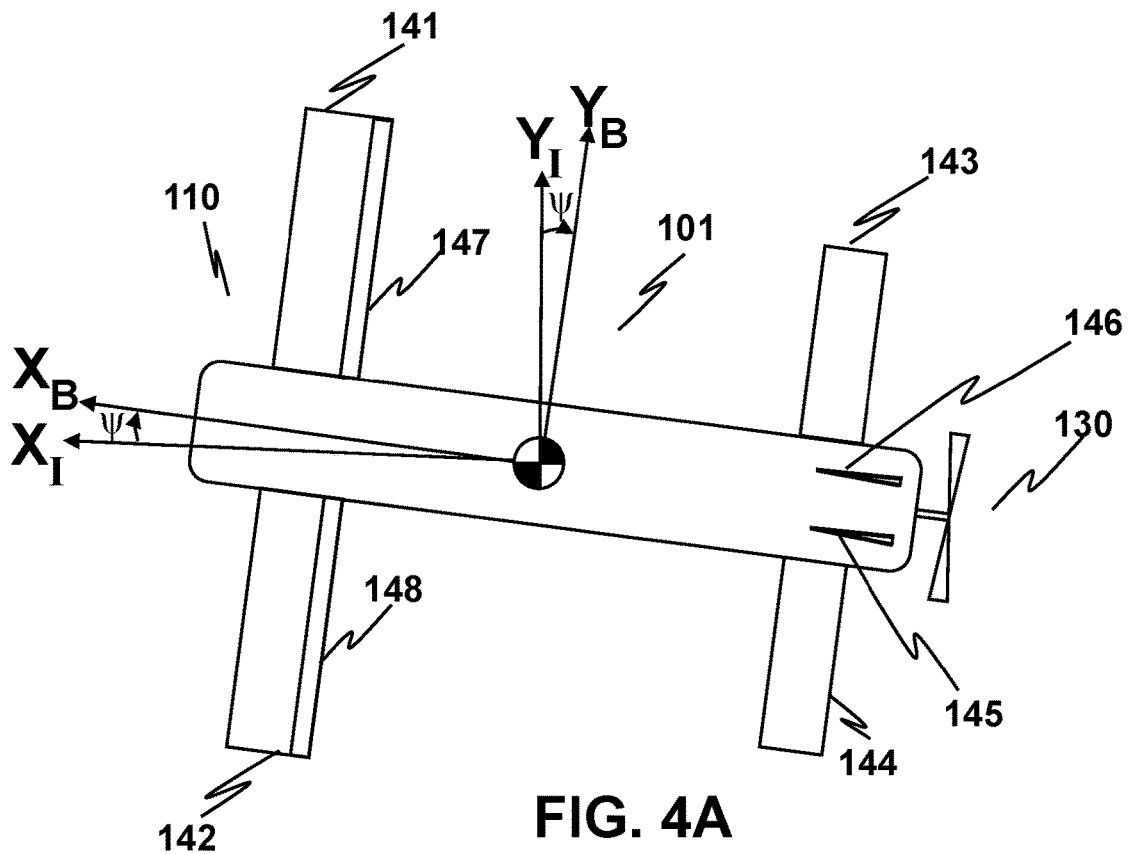
FIG. 4A depicts a top plan view of an exemplary embodiment of the UAV.
Figure 4B:
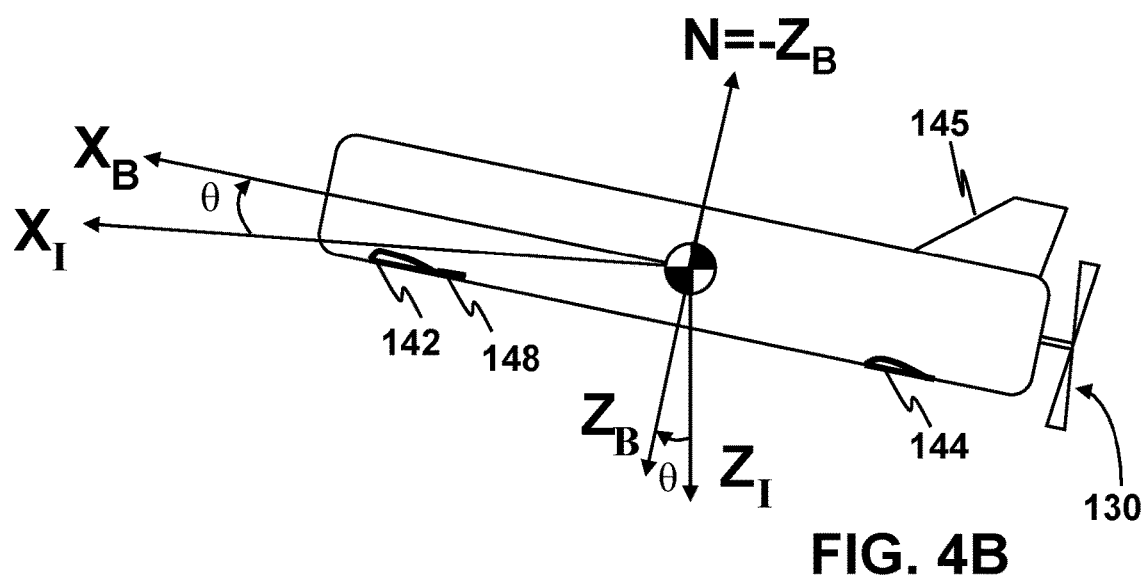
FIG. 4B depicts a side view of an exemplary embodiment of the UAV.
Figure 5:
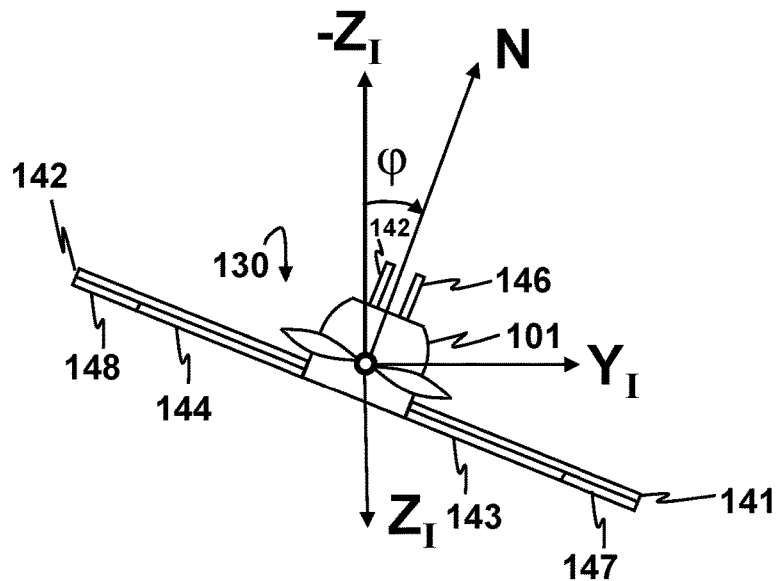
FIG. 5 depicts a tail view of an exemplary embodiment of the UAV.

FIG. 3A is top plan view of the exemplary UAV where the body of the UAV is depicted as turned, in the horizontal inertial plane, a yaw angle, ψ. FIG. 3B is a side view of the exemplary UAV where the UAV is depicted as turned, i.e., an elevated bore-sight, in the local longitudinal vertical inertial plane, a pitch angle, θ. FIG. 4A is a top plan view of an exemplary embodiment of a UAV having wing elements disposed proximate to an end of the UAV. FIG. 4B is a side view of an exemplary embodiment of a UAV having wing elements disposed proximate to an end of the UAV. FIG. 5 is a tail view of the exemplary UAV where the UAV is depicted as rotated clockwise, in the local lateral vertical plane, a roll angle, φ.

Figure 6:
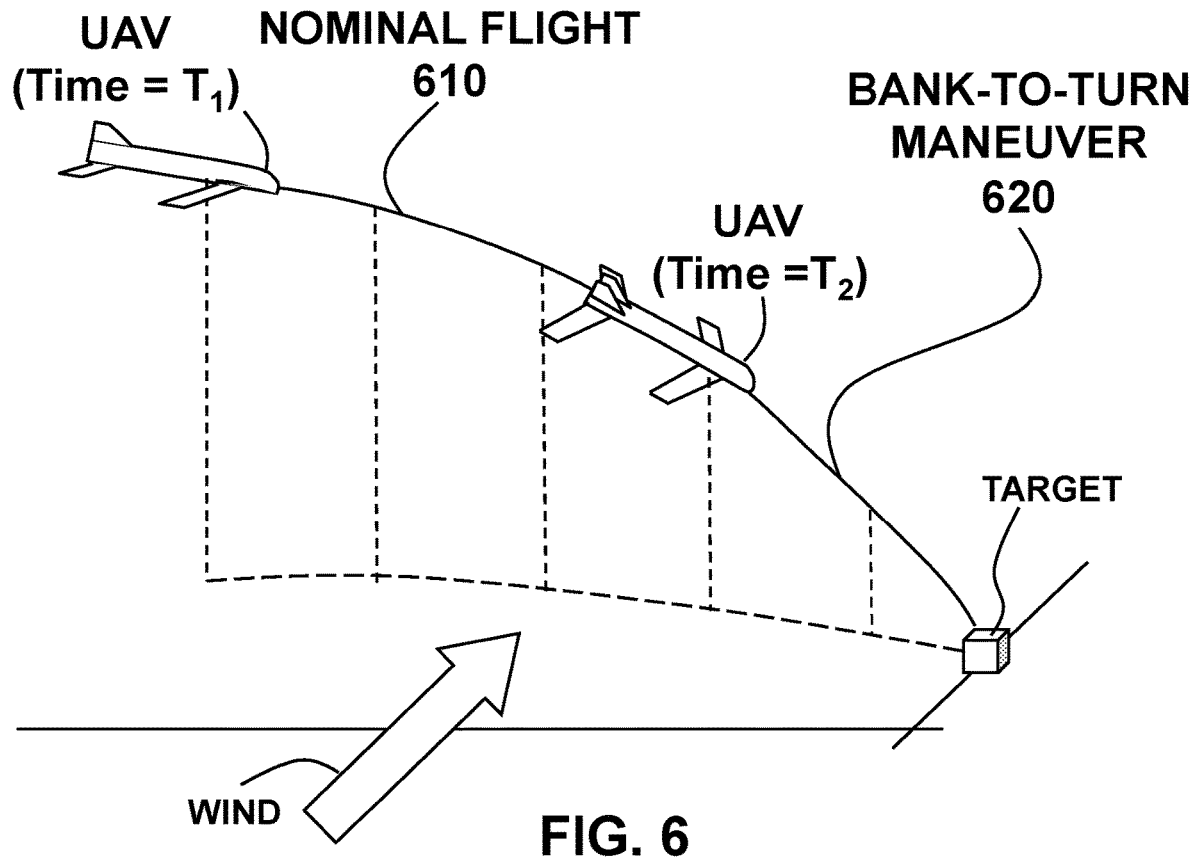
FIG. 6 depicts an exemplary UAV trajectory.

FIG. 6 depicts an exemplary UAV trajectory, where the dashed horizontal lines depict a direction above local ground level, and where the arcing curve, or arcing line segments depict a direction in which the UAV is homing toward the target at a relative time, $T_1$. Also depicted in FIG. 6 is a crosswind that tends to push the UAV laterally off course, i.e., away from an intercept course. The UAV may have a bank-to-turn autopilot and accordingly, may bank the UAV into the wind so as to maintain a terminal homing trajectory. FIG. 6 depicts the exemplary UAV at a relatively later time, $T_2$, with a bank angle into the wind. For a UAV carrying a directed warhead, or a paint designator, and in either example, a warhead that may eject matter from the UAV at an angle offset from the bore-sight offset of the UAV, the resulting bank angle may affect targeting accuracy. Crosswind may not be the only driver for such banked maneuvers. The air vehicle may have on onboard side-viewing camera where banking may provide advantage to target acquisition and/or tracking. Also, banking may be the result of the air vehicle executing a course correction having acquired the target and initiated a terminal homing phase or mode. The banking may also be the result of homing to a moving and/or evasive ground target, or moving and/or evasive air target. FIG. 6 illustrates the UAV as it transitions from a nominal flight 610 to a bank-to-turn maneuver 620 to effect an above-ground-level trajectory toward a target while accommodating the effects of transverse winds or other error; the crosswinds or other translational flight errors may be sensed at Time $T_1$. In this example, these errors may translate the UAV toward the left of the trajectory in this example. A clockwise roll angle adjustment about the UAV centerline is depicted accomplishing this maneuver by $T_2$. This may be embodied as an iterative process that may be repeated along the flight path.

Figure 7:
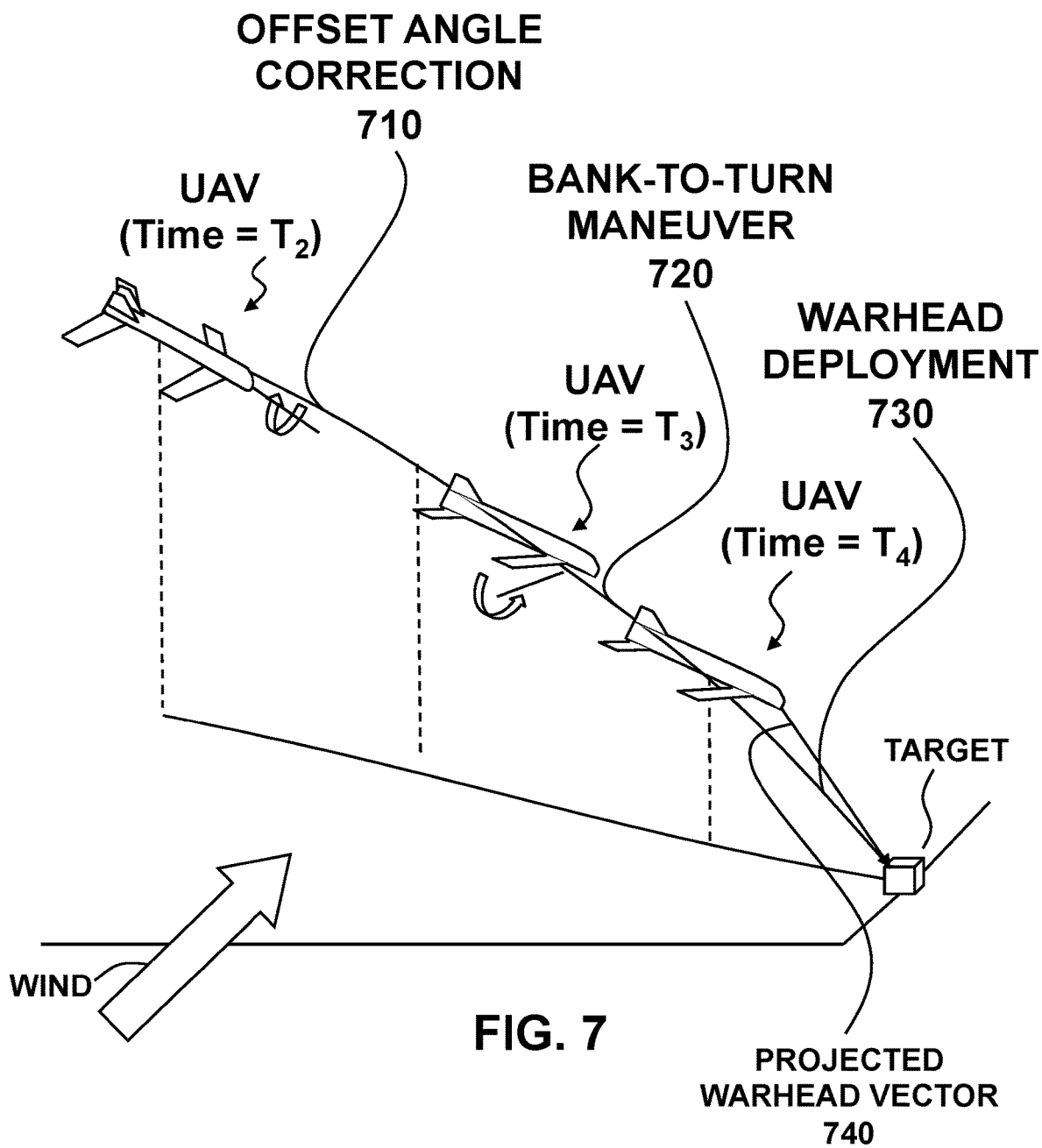
FIG. 7 depicts an exemplary UAV trajectory.

FIG. 7 depicts an exemplary UAV trajectory where the UAV is homing toward the target at the relative time, $T_2$, banking into the crosswind. The UAV may have an airspeed of 120 miles per hour (approximately 54 meters per second). The roll control may be more responsive than the pitch control of the bank-to-turn UAV. So, if the relative time, $T_2$, represents a range-to-target of about 50 meters, the vehicle may initiate a roll maneuver at relative time, $T_2$, that may be substantially completed by the relative time, $T_3$. The UAV, as it maneuvers to an upright orientation in this example, may translate laterally. So, in the relative time between roll maneuver completion, i.e., $T_3$, and warhead detonation, or paint ejection, $T_4$, there may be a lateral miss component.

E.g., a 10 mph crosswind may produce a lateral miss component of about five to seven meters prior to warhead detonation, or paint ejection. If the crosswind is estimated or measured and made available to the UAV guidance processing, the UAV may overcompensate laterally prior to initiating the roll maneuver so as to reduce the lateral miss component. The UAV may also be commanded to pitch up or pitch down to further aid in the aiming of the offset warhead, or paint ejector, so that by relative time, $T_4$, the vehicle may have a revised pitch angle. But, the pitch maneuver may not be as responsive to changing angles as the roll maneuver. Once the target point and boresight point are distinguishable from one another in the camera frame, the roll channel automatic control may be augmented to better align the boresight after $T_1$, with the projected warhead vector, and so the UAV may further bank, clockwise or counterclockwise, about the nominally corrective banking angle or instead of the nominally corrective banking angle. Once the offset angle is aligned and a time-to-go threshold is tripped, the vehicle control system may transition into an angle control system.

Figure 8A:
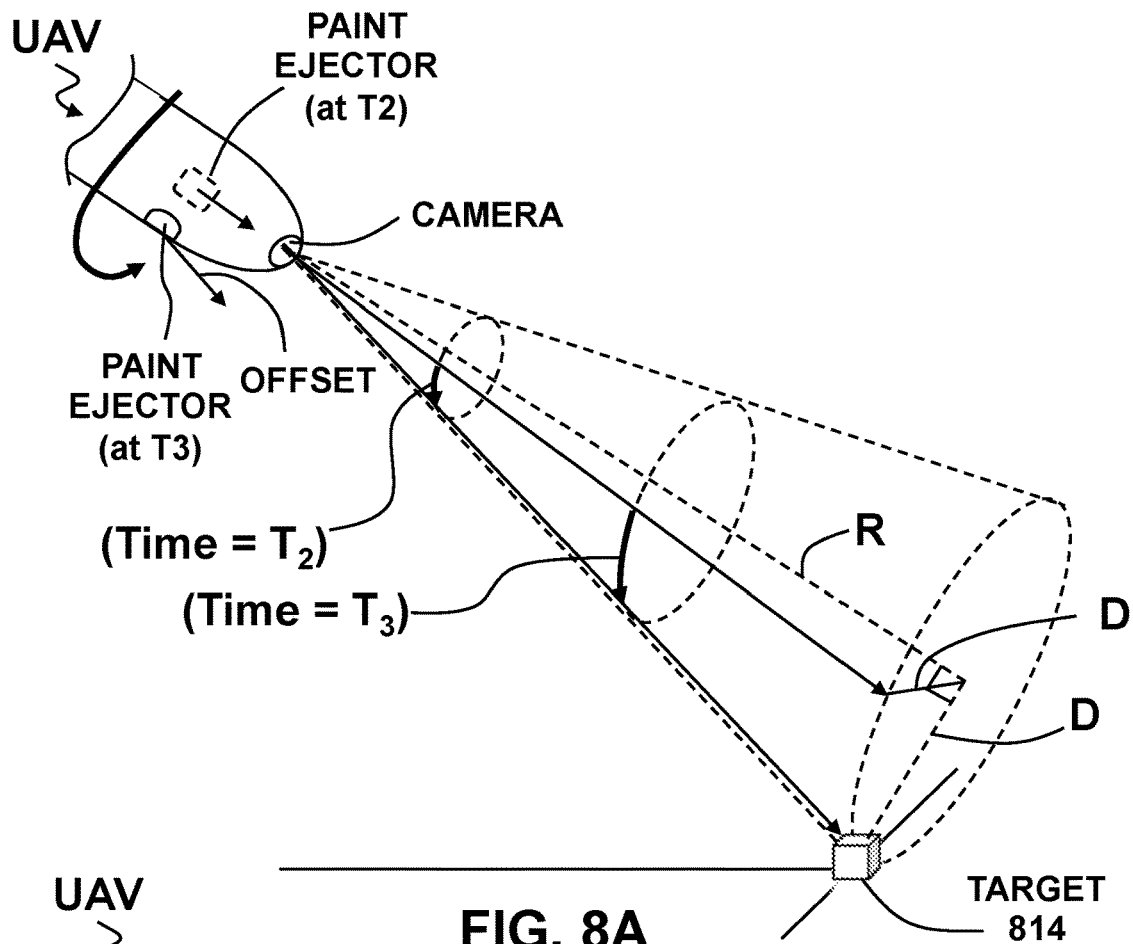
FIG. 8A depicts a front end portion of the UAV rolled into an angular position.

FIG. 8A is a depiction of a front end portion of the UAV rolled into an angular position favoring a more accurate aiming of the offset warhead, or paint ejector. From the exemplary perspective of a boresighted body-fixed, camera, the target will travel in an arc as the air vehicle rolls during the period of relative time $T_2$ to relative time $T_3$. The roll presents the paint ejector at relative time $T_3$, in a longitudinal plane defined by the boresight axis and the forward offset angle of the paint ejector. The range, R, is depicted in magnitude as a length to a plane orthogonal, i.e., lateral to, the boresight-offset angle longitudinal plane; an orthogonal plane upon which may be projected the offset angle of the offset paint ejector—depicted in magnitude as a distance, D, at relative time, $T_2$. For a constant offset angle and boresight angular orientation, the magnitude of the distance D decreases as the magnitude of the range, R, decreases.

Figure 8B:
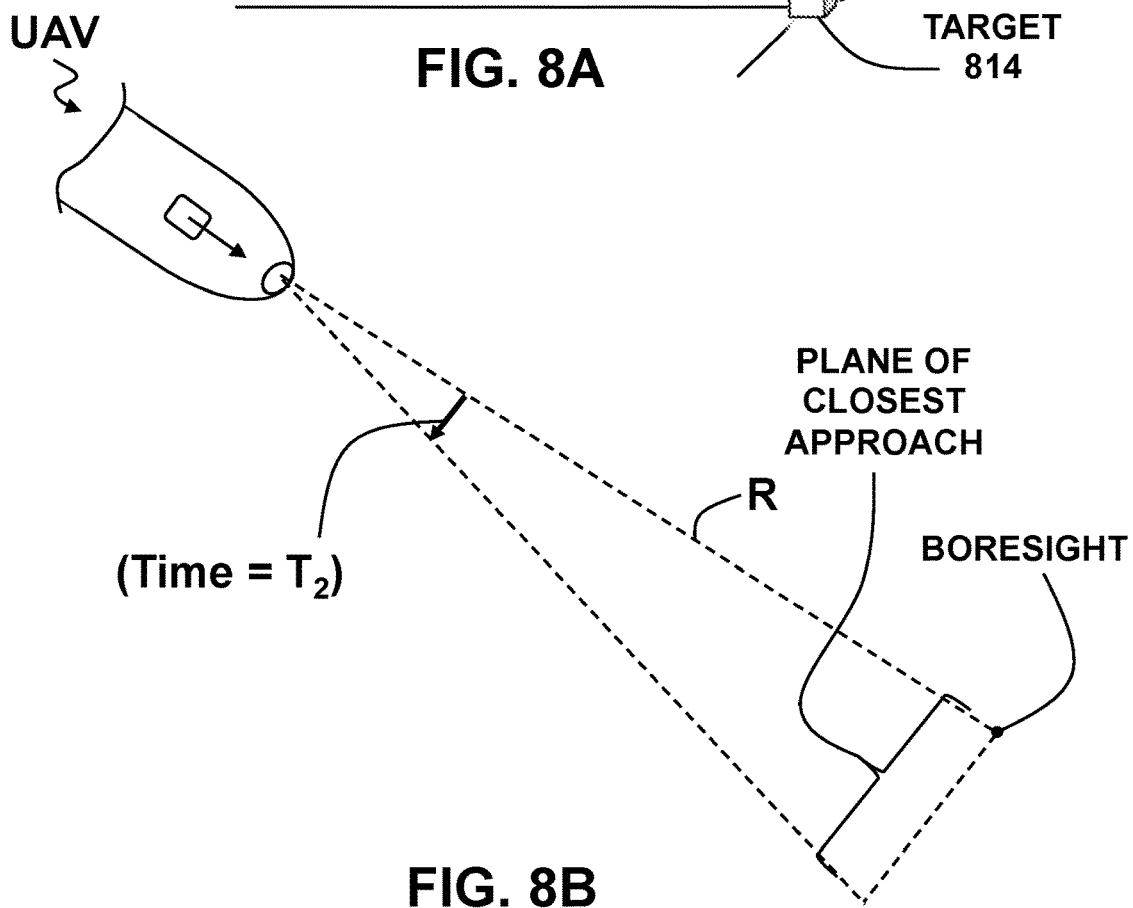
FIG. 8B depicts the directional warhead when projected into the plane of the closest approach.
Figure 8C:
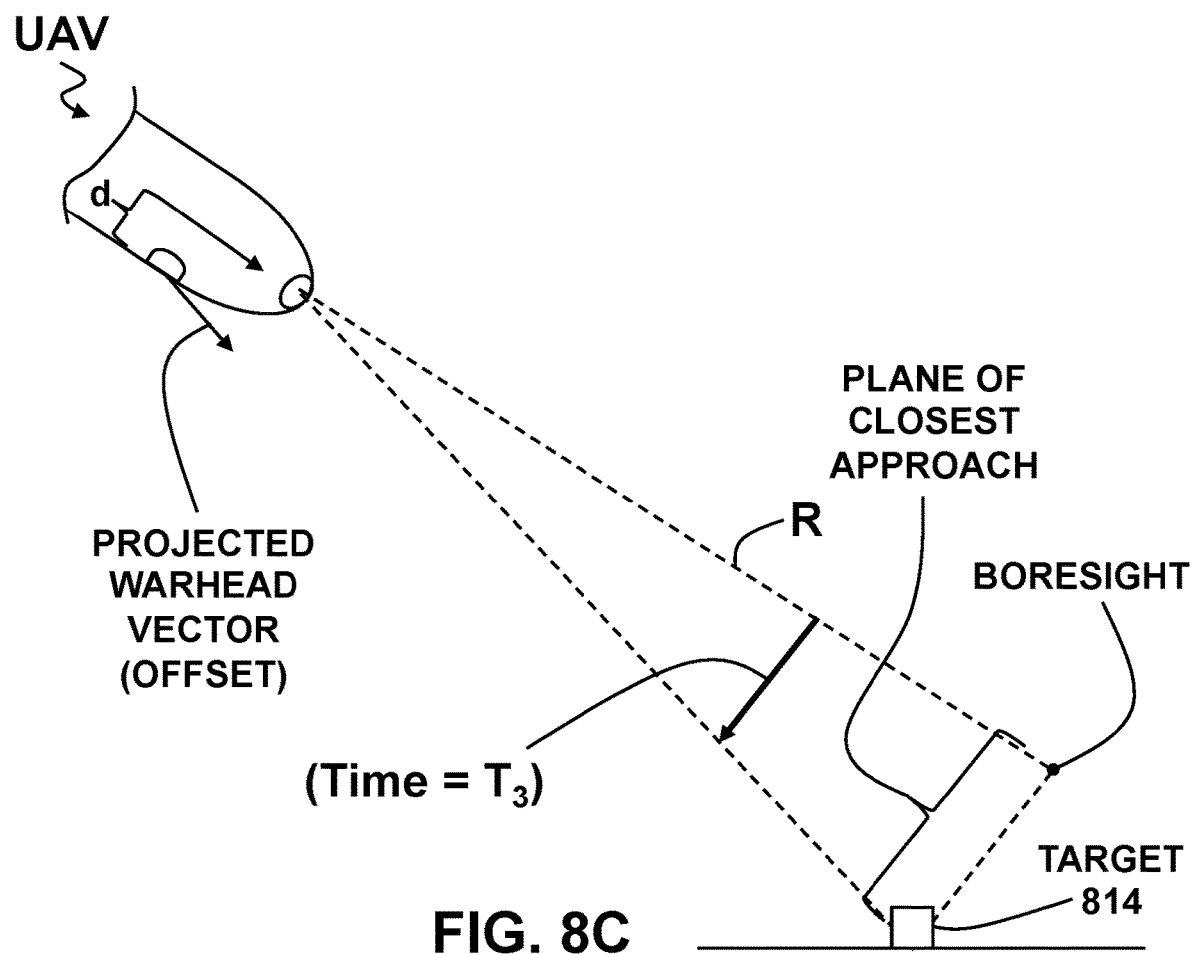
FIG. 8C depicts vehicular roll around the boresight at a first time.

FIG. 8B depicts the directional warhead when projected into the plane of the closest approach, and depicts the target i.e., the boresight point. The offset angle η represents the polar distance from boresight point, i.e., the projection of the range R, to the target point in the body-fixed camera frame. The offset angle η can be referenced in the camera fame from the distance D from the projection of the range-to-closest-approach to the target. The distance from UAV centerline to the direction of the warhead may be represented by d. Where the "d" may range for example from zero (i.e., at the UAV centerline) to one-half of the diameter of the UAV, (i.e., a point locally tangent to the fuselage skin of the UAV.) FIG. 8B depicts the UAV at flight time $T_2$ FIG. 8C depicts the UAV having rolled at flight time $T_3$.

Figure 8D:
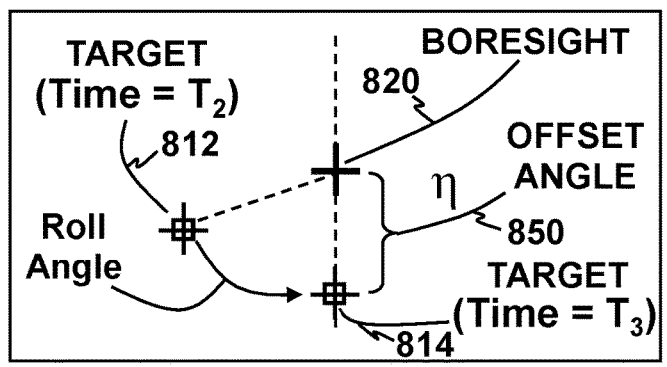
FIG. 8D depicts vehicular roll around the boresight at a second time.

FIG. 8D is a depiction, in a body-fixed camera perspective, of a vehicular roll around the boresight 820, e.g., around the vehicle centerline or roll axis of rotation, where the target 812 appears to the right of the boresight at relative time, $T_2$, and appears below the boresight at relative time 814, $T_3$. The distance from the boresight to the target relative time, $T_3$, represents the offset angle 850, η, i.e., the arctangent of the projected offset distance, D, over the range, R. Again, the offset angle may be invariant, and due to the decreasing magnitude of the range, R, the distance D will likewise decrease. For example, a five meter offset distance at a range of 50 meters is approximately 0.1 radians (using a small-angle approximation), which is an offset angle, η, of about 5.7 degrees. In some embodiments, the offset angle may range from zero to ninety degrees from centerline, and in other embodiments the offset angle may range from five to forty-five degrees from a centerline or five to ten degrees from a centerline, i.e., off-axis. Some embodiments may have warheads that deploy aftward, where the offset angle may range from ninety degrees to one-hundred eighty degrees from a centerline, and other embodiments may range from one-hundred thirty five degrees to one-hundred seventy five degrees from a centerline or one-hundred seventy degrees to one-hundred seventy-five degrees from a centerline. For that same offset angle, the offset distance at 100 meters to target is about ten meters.

Figure 8E:
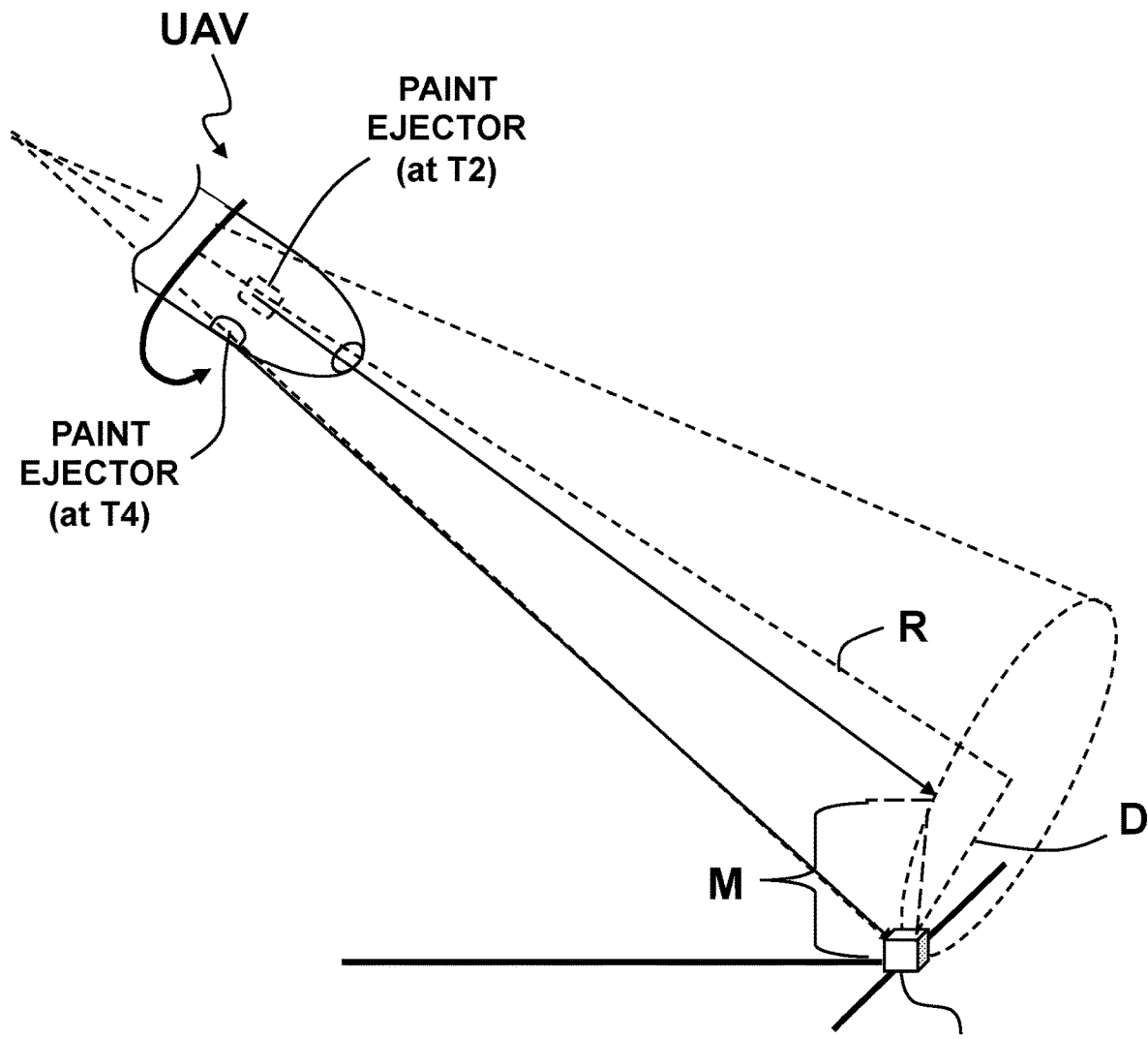
FIG. 8E depicts a perspective of an exemplary paint ejector having an offset angle bias from the centerline of the UAV.

FIG. 8E depicts, in a perspective of the paint ejector having an offset angle bias from the forward-directed centerline of the air vehicle, the paint ejector having a prior orientation, as in the banking maneuver at the relative time, $T_2$, of FIG. 8A, that, in this example, would eject paint at relative time, $T_4$, in a direction missing the target by a distance, M. With a roll-to-point maneuver effected by relative time, $T_4$, the paint ejector is depicted as aligned to eject paint in a direction that is incident on the target. It is noted that while FIGS. 6, 7, and 8A-8E depict, by example, a ground target, embodiments may be applied to airborne targets as well.

Figure 9:
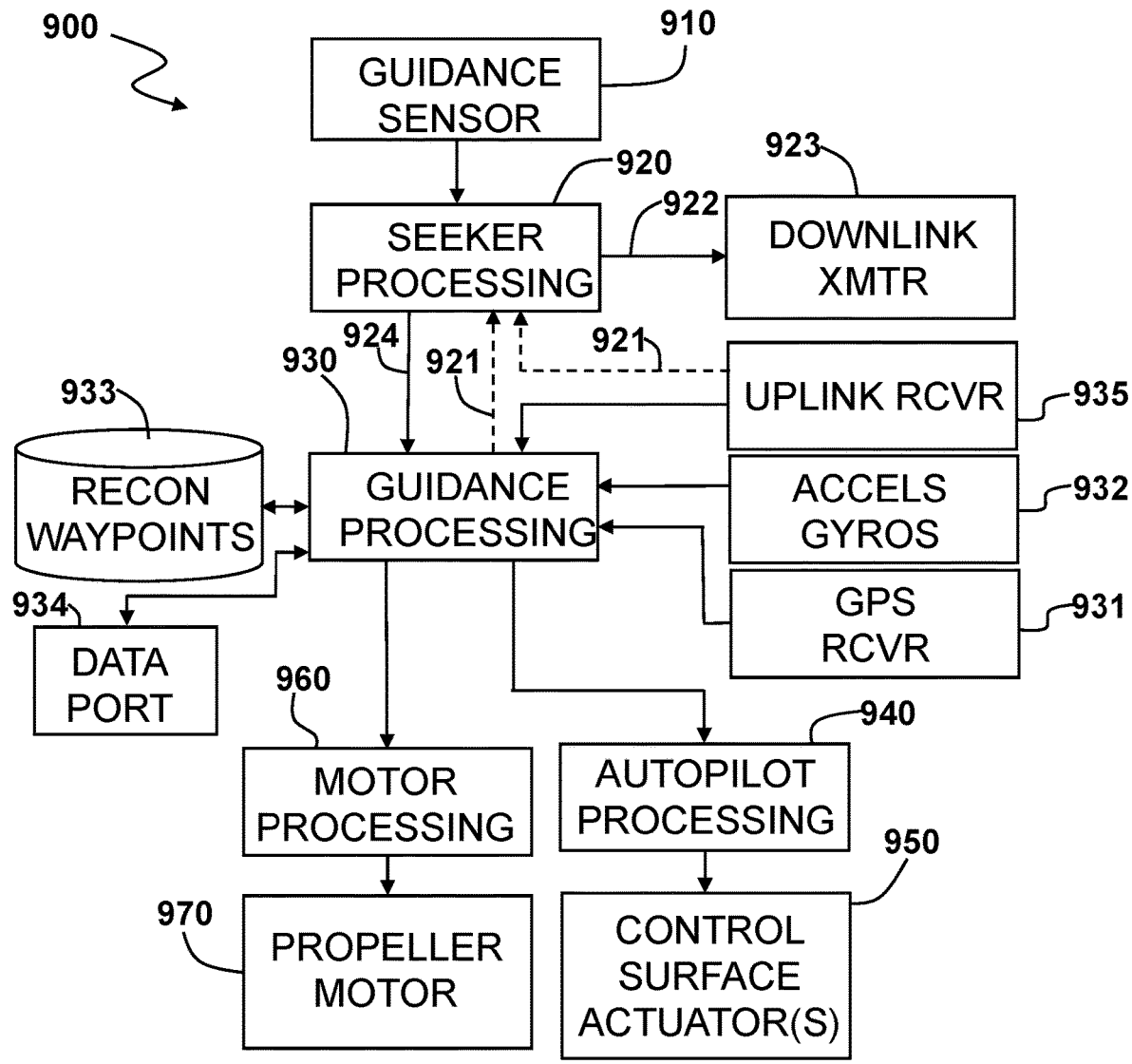
FIG. 9 depicts an exemplary functional block diagram of the UAV processing and guidance and control subsystem.

FIG. 9 is an exemplary functional block diagram of the UAV processing and guidance and control subsystem 900 where the guidance sensor 910 provides information about the external environment pertaining to seeking or tracking processing of a seeker or tracker processor 920. A guidance sensor, and more generally, a guidance sensor suite, may include a passive and/or active radar subsystem, an infrared detection subsystem, an infrared imaging subsystem, a visible light imaging subsystem such as a video camera-based subsystem, an ultraviolet light detection subsystem, and combinations thereof. The seeker processor 920 may include both image processing and target tracking processing, and target designation or re-designation input 921 that may be received from an uplink receiver 935 and/or as an output of a guidance processor 930. The image processing and/or target tracking information 922 may be transmitted via a downlink transmitter 923, which may be a part of an uplink/downlink transceiver. The guidance processor 930, in executing instructions for guidance processing, may take in the target information 924 from the seeker processor 920, and UAV flight status information such as position, velocity, and/or attitude from the GPS receiver 931, and/or gyroscopes and accelerometers 932, if any. The guidance processor 930, to receive navigation waypoints and/or target search optimizing trajectories, may reference a memory store 933. For system embodiments, the guidance process 930 may receive and/or upload navigation waypoints and/or target search optimizing trajectories, by way of an external data port 934, e.g., during a pre-launch phase, or by way of an uplink receiver 935, e.g., during a post-launch phase. The guidance processor 930, as part of executing instructions for determining flight path, a trajectory, or a course steering angle and direction, may reference the waypoint and/or surveillance optimizing trajectory information, particularly when not in a terminal homing mode. The guidance processor 930 may receive a command via an uplink receiver 935 to switch or otherwise transition from a terminal homing mode to a target search mode, i.e., non-terminal homing mode, and switch from a target search mode to a terminal homing mode. The UAV may autonomously, or responsive to an uplink, process images from a side-mounted camera, i.e. sensor 115 (in FIG. 1), or other scene-sensing sensor, and switch to a front-mounted camera or other scene-sensing sensor. For example, a visual target lock by the seeker processor 930 may be tracked with reference to GPS coordinates and integrated into a terminal homing solution that may be iteratively determined by the guidance processor executing instructions pertaining to determining a revisable terminal solution. The guidance processor 930 may include a strap-down navigation solution aided by the GPS receiver, and may accordingly support the storage of pre-terminal commit points or return waypoints following a break from terminal homing that may be initiated by an external uplink or initiated autonomously based on scene changes during the terminal homing phase. Thereafter, the UAV may return to a volume of space within, proximate to, or substantially the same volume of space from which it initiated the preceding terminal phase. Embodiments of the avionic sensors may include exemplary devices such as a digital camera having five megapixel resolution, an image rate of 60 Hz, digital zoom, e.g., 1X-3X, regional subframing, and automatic brightness control, and/or a long wavelength infrared camera having a 640×480 FPA format, a STMicroelectronics of Geneva, Switzerland ARM™ 9 microcontroller, a STMicroelectronics LIS3L02DQ MEMS 3-axis linear accelerometer, Analog Devices, Inc. of Norwood, Mass. ADXRS612 gyroscopes, a Silicon Microstructures, Inc. of Milpitas, Calif. SM5872 air speed sensor, a VTI Technologies, Inc. of China SCP1000-D01/D11 Pressure Sensor as Barometer and Altimeter, a Honeywell, Inc. of Plymouth, Minn. HMC 1043 magnetometer, and a uBlox of Thalwil, Switzerland NEO-5Q GPS (L1, C/A code) receiver and a patch L1 GPS antenna. Other GPS receivers and antennas may be used depending on the mission and expected environmental conditions.

Embodiments of the UAV may exhibit flight air speed in the range of 57 to 130 miles per hour (50-112 knots), however other air speeds are possible. An example of a terminal homing mode may utilize a combination of pursuit and proportional navigation guidance with a gravity bias that may be applied for strike sub-modes of the terminal homing mode, and an acceleration bias that may be applied for aerial intercept sub-modes of the terminal homing mode. The guidance processing 930 and autopilot processing 940 may execute instructions to effect a bank-to-turn guidance, for example in an elevon embodiment, to redirect the air vehicle by reorienting its velocity vector principally via roll angle and lift, and additional via propeller throttling. For example, one or more control surfaces may be reoriented via one or more control surface actuators 950 causing forces and torques to reorient the air vehicle and the portion of its linear acceleration that is orthogonal to its velocity vector. The portion of the linear acceleration of the air vehicle that is along the velocity vector is greatly affected by aerodynamic drag, and the linear acceleration may be increased via a motor processor 960 and a propeller motor 970. For embodiments with full three-axis control, additional control topologies may be implemented including skid-to-turn and other proportion-integral-differential guidance and control architectures. The seeker processing, guidance processing, motor processing, and/or autopilot processing may be executed by a single microprocessor having addressable memory and/or the processing may be distributed to two or more microprocessors in distributed communication, e.g., via a data bus.

Figure 10:
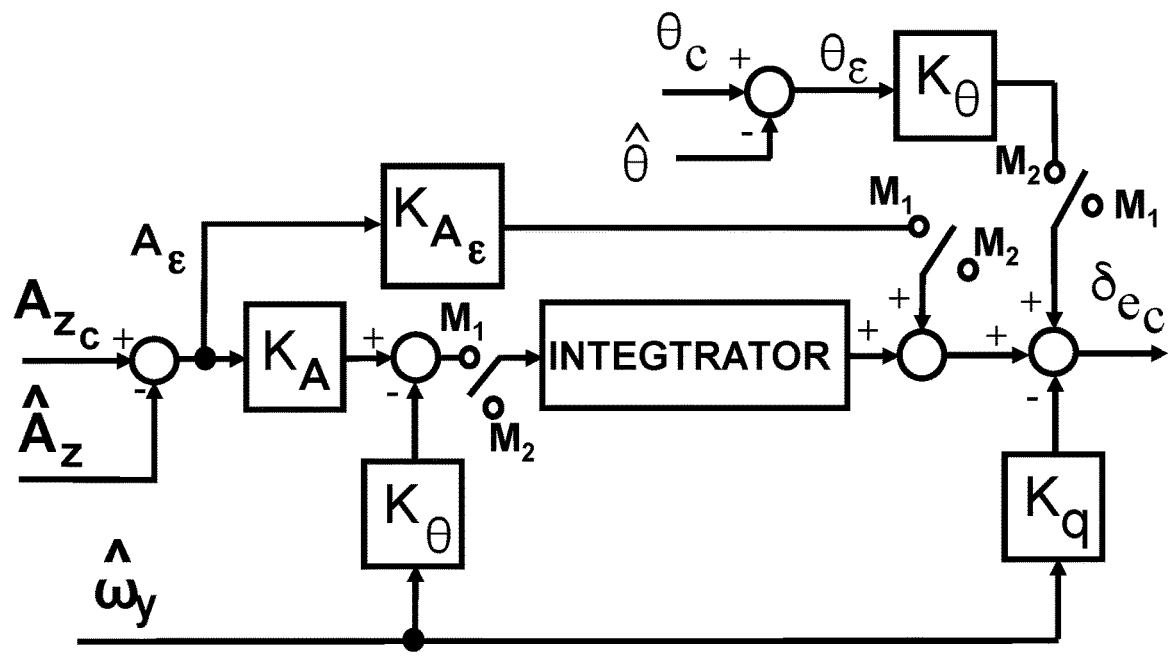
FIG. 10 depicts, in a functional block diagram, an exemplary pitch channel autopilot of the UAV.

FIG. 10 depicts an exemplary pitch channel autopilot of the UAV where the topology is an acceleration command, proportional-integral control architecture in combination with an optional attitude command, proportional-integral control architecture. In the maneuver mode, $M_1$, the pitch channel generates elevator actuator command $\delta_e$, based on a body acceleration command error, $A_e$, and the measured or estimated body pitch rate, $\omega_y$. In the optional pitch body-pointing mode, $M_2$, the pitch channel generates elevator actuator command $\delta_{e_c}$ based on a body attitude command error, $\theta_\varepsilon$, and the measured or estimated body pitch rate, $\omega_y$. The autopilot gains, $K_A$, $K_{A\varepsilon}$, $K_\Theta$, and $K_q$, may be fixed, adaptive or gain-scheduled, and optionally some paths may not be used or mechanized. The integrator may be a digital integrator, running a rate of $1/\Delta T$, e.g., $$\frac{\Delta Tz}{z-1},$$

with numerical memory limits to avoid windup, where "z" is representative of the z-transform of a delay, $z^{-1}$.

Figure 11:
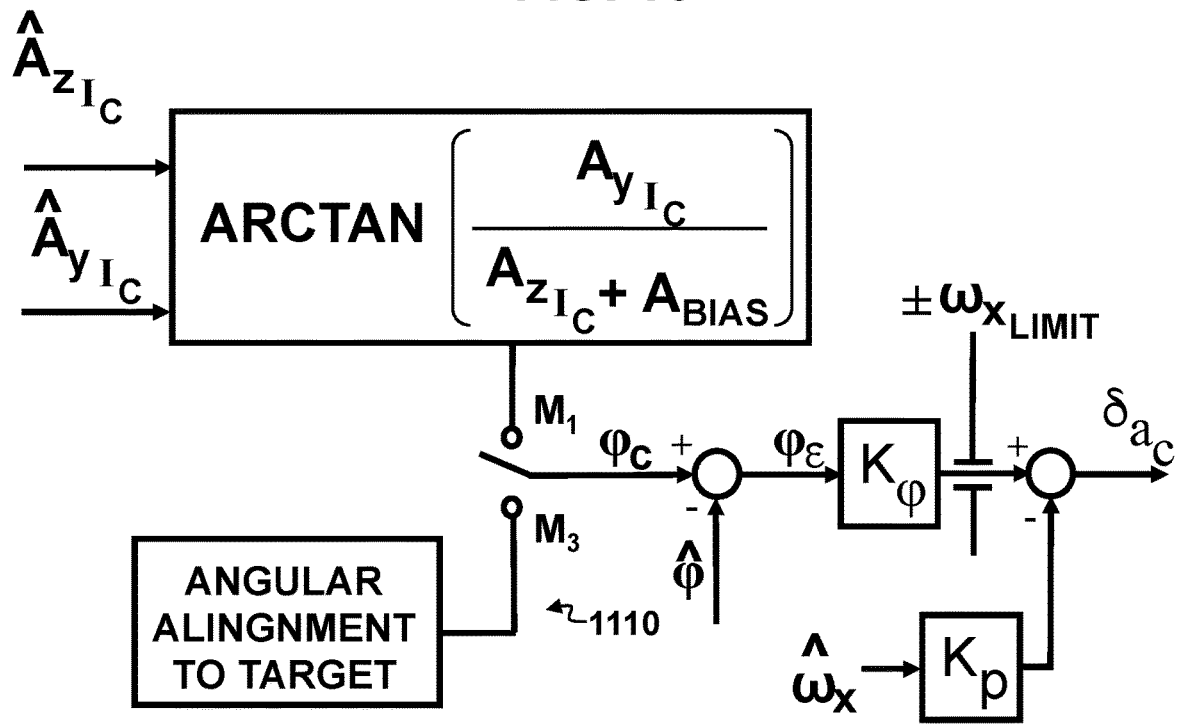
FIG. 11 depicts, in a functional block diagram, an exemplary roll channel autopilot of the UAV.

FIG. 11 depicts an exemplary roll channel autopilot of the UAV where the topology is an attitude command, proportional-integral control architecture. In the maneuver mode, $M_1$, the pitch channel generates elevator actuator command $\delta_{e_c}$ based on a body acceleration command error, $A_\varepsilon$, and the measured or estimated body pitch rate, $\omega_y$. In the roll body-pointing mode, $M_3$, the roll channel generates aileron actuator command $\delta_{a_c}$ based on a body attitude command error, $\varphi_\varepsilon$, and the measured or estimated body roll rate, $\omega_x$. The autopilot gains, $K_\varphi$, and $K_p$, may be fixed, adaptive or gain-scheduled, and optionally some paths may not be used or mechanized. The roll attitude command, $\varphi_c$, may be generated during the maneuver mode, $M_1$, by applying an arctangent function to the estimated local vertical and horizontal inertial accelerations, i.e., $$\hat{A}_{z_{I_c}} \text{ and } \hat{A}_{y_{I_c}}.$$

The roll attitude command, $\varphi_c$, may be provided during the roll body-pointing mode, $M_3$, a roll angular command for angular target alignment based on inertial instruments, estimates of the local level, and/or video processing the target image and the field of the target image. The target location may be estimated or provided by a third-party, post-launch, e.g., in local inertial coordinates or biased GPS coordinates, and/or may be revised or established post-launch. For example, the target processing may estimate the relative location of the target in a pair of angles-of-arrival. The polar representation of the angles-of-arrival will have an angular component that may be treated as the roll command for the autopilot when attempting to align the vehicle in roll for an offset warhead or paint ejector. See $M_3$ of FIG. 11, that supports the switch in alignment error 1110. The roll channel of FIG. 11 also depicts a roll rate command limiter having a value of $\pm\omega_{x(LIMIT)}$ so that the air vehicle may not be commanded to spin faster than the angular rate sensors can measure. An air vehicle with an airspeed of about 120 mph and a roll rate of 150 degrees per second may be expected to be able to orient the vehicle in the range of about 50 meters to target. In some embodiments, the roll channel control or the roll channel with the pitch channel control may be used to maintain the offset angle correction via control surface actuation.

Figure 12A:
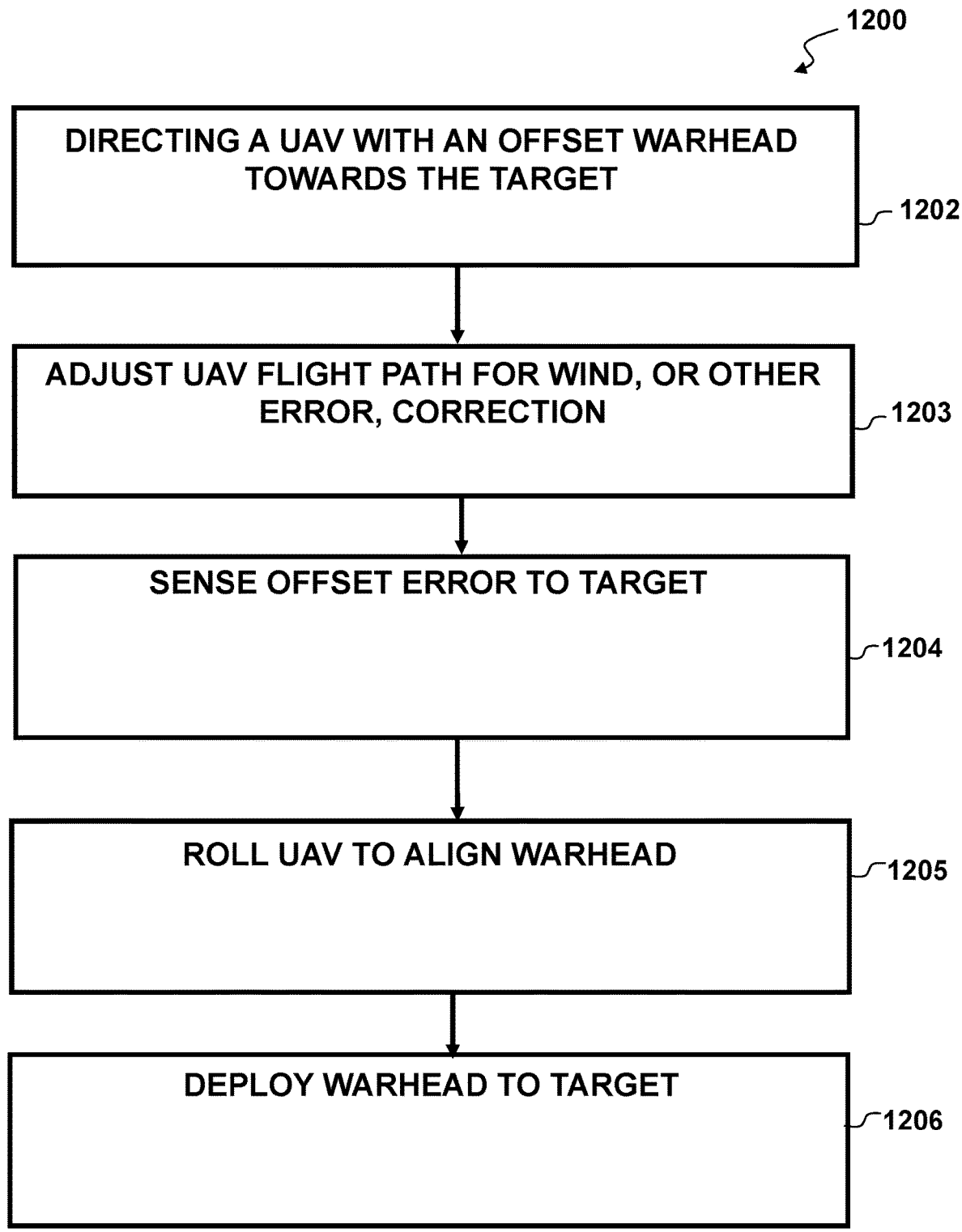
FIG. 12A depicts, in a top level flowchart, an exemplary process of operation.

FIG. 12A is a flowchart 1200 depicting an exemplary flight process comprising the steps of: (a) directing a UAV with an offset warhead towards the target (block 1202); adjust UAV flight path for wind, or other error, correction (block 1203); sense offset error to target (block 1204); roll UAV to align windward (block 1205); and deploy warhead to target (block 1206).

Figure 12B:
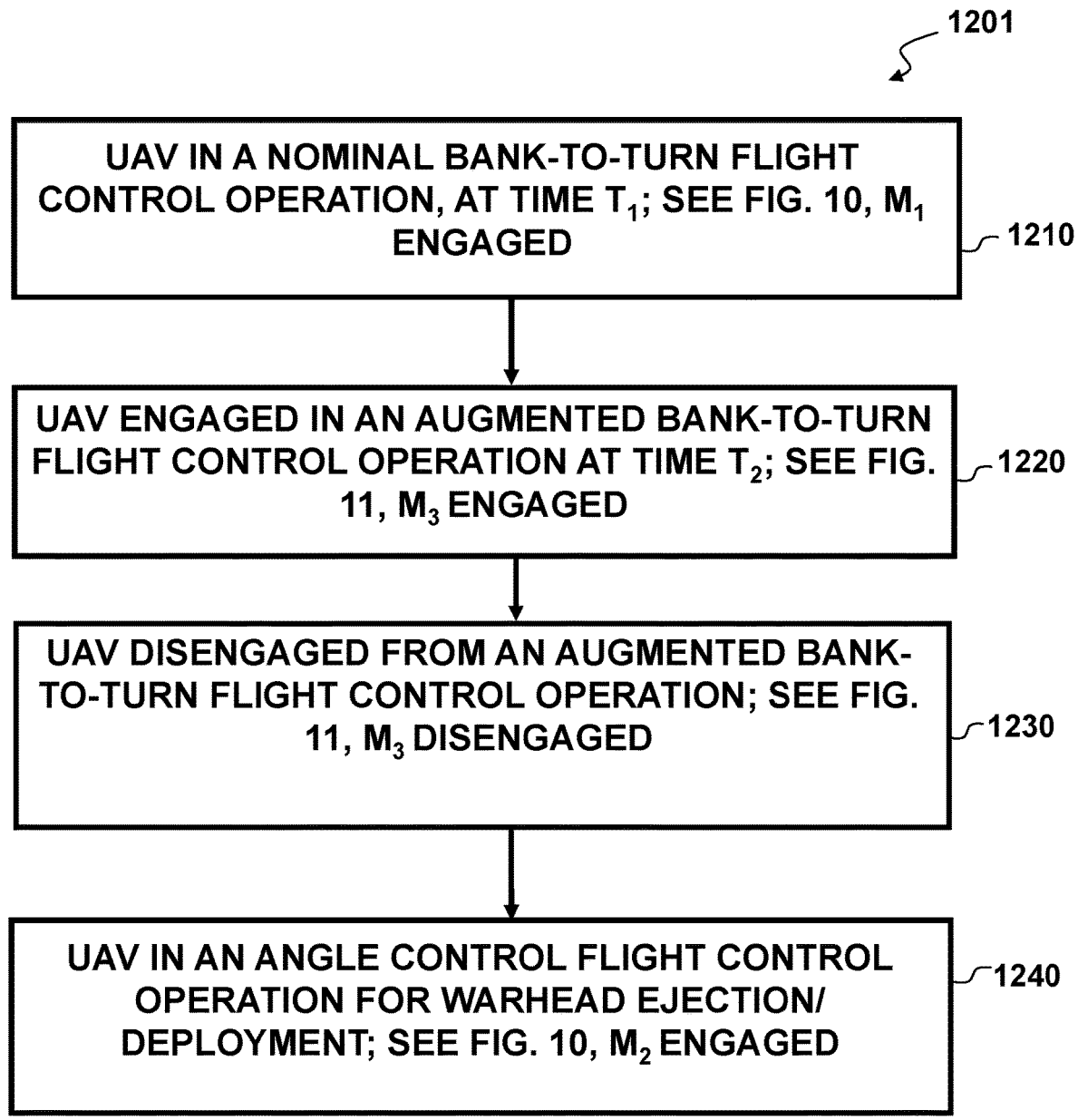
FIG. 12B depicts, in an exemplary flowchart, a UAV in a nominal bank-to-turn flight control operation.

FIG. 12B is a flowchart 1201 depicting a UAV in a nominal bank-to-turn flight control operation at time $T_1$; see FIG. 10, $M_1$ engaged (block 1210). Also illustrated is a UAV engaged in an augmented bank-to-turn control operation at $T_2$; see FIG. 11 $M_3$ engaged (block 1220). Also depicted is a UAV disengaged from an augmented bank-to-turn control flight operation at time $T_3$; see FIG. 11 $M_3$ disengaged (block 1230). Also illustrated is a UAV in an angled flight control operation for warhead ejection/deployment at time $T_4$; see FIG. 10 $M_2$ engaged (block 1240).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method comprising:
   determining, by a processor, an orientation of an unmanned aerial vehicle (UAV) to obtain a terminal homing trajectory towards a target in consideration of at least one of: a crosswind and a motion of the target;
   effecting, by the processor, a movement of one or more UAV control surfaces to achieve the determined orientation of the UAV;
   determining, by the processor, at a predefined distance away from the target, an angle offset of the UAV relative to the target so that an ejection of a mass from the UAV will be directed towards the target; and
   effecting, by the processor, the ejection of the mass from the UAV towards the target.

2. The method of claim 1 wherein the angle offset is based on a distance between a target point and a boresight point of a body-fixed image frame.

3. The method of claim 2 further comprising:
   effecting, by the processor, the angle offset of the UAV relative to the target by a movement of the one or more UAV control surfaces.

4. The method of claim 3, wherein the effected angle offset comprises an angular roll component to translate the target point in the body-fixed image frame to thereby maintain an offset angle via the boresight offset angle correction value.

5. The method of claim 4 further comprising:
   effecting, by the processor, a movement of the one or more UAV control surfaces comprising a pitch component to translate the target point in the body-fixed image frame to thereby maintain the offset angle via the boresight offset angle correction value.

6. The method of claim 4 wherein the movement of the one or more UAV control surfaces further comprises orienting the target point in the body-fixed image frame below a boresight point in the body-fixed image frame.

7. The method of claim 4 wherein the movement of the one or more UAV control surfaces further comprises actuating one or more aileron actuators.

8. The method of claim 4 wherein the movement of the one or more UAV control surfaces is by one of: a bank-to-turn guidance and a skid-to-turn guidance.

9. The method of claim 4 wherein the target point is based on a target in motion.

10. An unmanned aerial vehicle (UAV) comprising:
a processor having addressable memory, the processor configured to:
- determine an orientation of the UAV to obtain a terminal homing trajectory towards a target in consideration of at least one of: a crosswind and a motion of the target;
- effect movement of one or more UAV control surfaces to achieve the determined orientation of the UAV;
- determine at a predefined distance away from the target, an angle offset of the UAV relative to the target so that an ejection of a mass from UAV will be directed towards the target; and
- effect the ejection of the mass from the UAV towards the target.

11. The UAV of claim 10 wherein the crosswind is based on a crosswind estimation.

12. The UAV of claim 10 wherein the crosswind is based on a crosswind measurement.

13. The UAV of claim 10 wherein the predetermined distance away from the target is based on a range-to-target.

14. The UAV of claim 10 wherein the target is an air target.

15. The UAV of claim 10 wherein the processor is further configured to:
- effect movement of the one or more UAV control surfaces to reorient the UAV in attitude based on the angle offset of the UAV relative to the target.

16. The UAV of claim 15 wherein the effected movement to reorient the UAV in attitude orients a target location in a body reference frame below an orientation of the UAV in the body reference frame.

17. The UAV of claim 15 wherein the movement of the one or more UAV control surfaces comprises one or more aileron actuator commands.

18. The UAV of claim 15 wherein the effected movement to reorient the UAV in attitude is via a bank-to-turn guidance.

19. The UAV of claim 15 wherein the effected movement to reorient the UAV in attitude is via a skid-to-turn guidance.

20. The UAV of claim 15 wherein the effected movement to reorient the UAV in attitude is about a centerline of the UAV.

* * * * *